Patented May 30, 1950

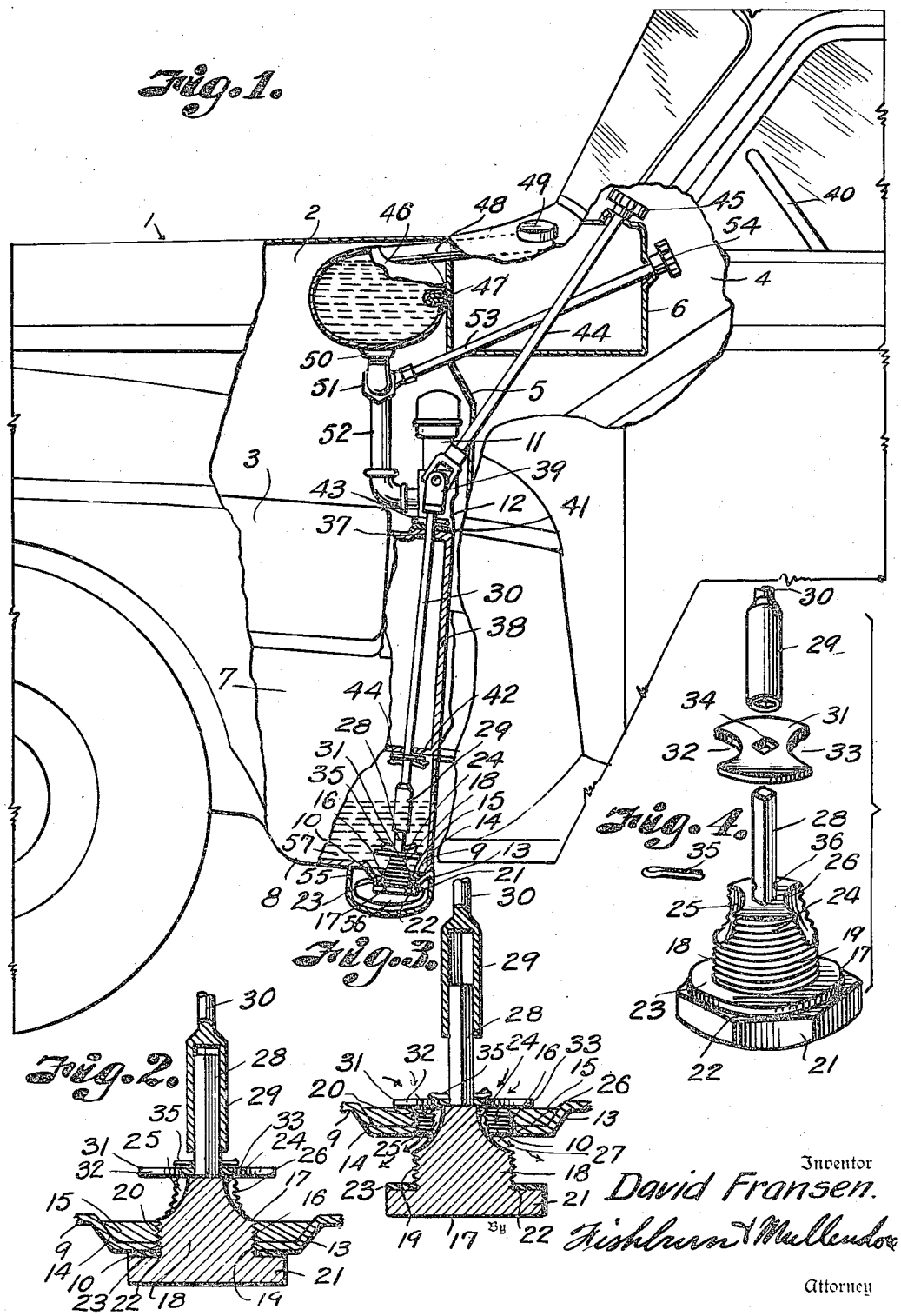

2,509,426

UNITED STATES PATENT OFFICE 2,509,426

APPARATUS FOR CHANGING LUBRICATING OIL OF MOTOR VEHICLES

David Fransen, Wichita, Kans.

Application October 26, 1944, Serial No. 560,459

5 Claims. (Cl. 137—21)

This invention relates to apparatus for servicing the engine of a motor vehicle with lubricating oil.

Motor vehicles now constructed require replacement of the lubricating oil after certain specified periods of operation in order to maintain efficient operation and avoid excessive wear. However, it is many times inconvenient to change the oil at the desired time and the vehicle is operated considerably beyond the specified period.

In present vehicle construction it is necessary to change oil at service stations so that the serviceman may remove the drain plug from the crankcase and allow the used oil to drain from the crankcase into a container, after which the drain plug is re-inserted before new oil is poured into the crankcase. In most cases, the oil is drained while hot and it is quite common for the serviceman to burn his hands and drop the plug into the drained oil container. This is particularly true when large plugs are used, and causes considerable inconvenience and loss of time.

It is, therefore, the principal object of the present invention to provide apparatus for servicing the engine of a motor vehicle with lubricating oil while the vehicle is in operation.

Other objects of the invention are to provide an apparatus of this character which is conveniently and safely operated from the interior of the motor vehicle; to provide a drain plug which securely retains the oil and which at all times has threaded engagement with the drain opening so that it cannot be displaced therefrom; and to provide an auxiliary tank for containing a measured supply of new oil on the vehicle to replace the drained oil.

In accomplishing these and other objects of the invention, I have provided improved structure, the preferred form of which is illustrated in the accompanying drawing wherein:

Fig. 1 is a side elevational view of a vehicle equipped with the present invention, parts being broken away to better illustrate the invention.

Fig. 2 is an enlarged sectional view through the drain plug showing the drain plug in closed position.

Fig. 3 is a similar section showing the drain plug in open position to allow for draining of the oil from the crankcase when the vehicle is in motion.

Fig. 4 is a perspective view of the parts of the drain plug shown in disassembled spaced relation.

Referring more in detail to the drawings:

1 designates a motor vehicle having the usual engine compartment 2 in which is located an engine 3 separated from the driver's compartment 4 by a panel 5 including an instrument board 6. The engine 3 has a crankcase 7 closed at the bottom by an oil pan 8. The oil pan 8 has a sump portion 9 provided with a drain opening 10 therein through which used lubricating oil is drained as later described. The engine is also provided with an oil fill pipe 11 opening upwardly into the compartment 2 and having the lower end 12 in connection with the crankcase through which a fresh supply of lubricating oil may be inserted. The drain opening 10 is formed in an outwardly offset portion 13 of the sump 9 to provide an annular recess 14 receiving a ring 15 having an internally threaded opening 16 therethrough registering with the opening 10. The ring 15 is welded or otherwise permanently attached to the oil pan and engaged therewith is a drain plug 17. The drain plug 17 includes a cylindrical portion 18 having external threads 19 conforming to the threads 20 of the ring 15. The drain plug also includes an enlarged head 21 preferably of hexagonal shape so that it may be operated with a wrench if desired. The head 21 forms a shoulder 22 encircling the threaded portion of the plug to seat a gasket ring 23 that forms a seal with the bottom face of the oil pan when the plug is screwed tightly into the threaded opening of the ring 15.

The plug 17 is of longer length than the conventional plug so as to provide a portion 24 extending upwardly into the sump of the oil pan and to accommodate radial ports 25 and 26 formed in opposite sides thereof as best shown in Fig. 4. The ports 25 and 26 may be formed by providing notches in the threaded portion of the plug having sufficient depth so that when the plug is unthreaded the ports will have outlets 27 below the downset portion of the oil pan to provide for outlet of oil while the upper portion of the plug retains threaded engagement with the threads of the ring as shown in Fig. 3. The notches forming the ports have sufficient width and extend inwardly into the plug in the direction of the axis thereof to cooperate with the threaded opening of the ring for providing inlets to the ports of sufficient capacity to allow substantially free drainage of the oil from the sump. In order to prevent complete displacement of the plug when the plug is moved to open position, and to permit operation thereof from the interior of the vehicle, the plug has an axial stem 28 projecting upwardly into the crankcase and of polygonal cross section to connect a socket 29 of an operating rod 30 later described. Sleeved over the stem 28 is a stop washer 31 to seat against the inner end of the plug. The stop washer is of larger diameter than the drain opening so that the periphery thereof engages the upper face of the threaded ring 15 as shown in Fig. 3 when the plug is in open position. In order that the oil may find outlet through the ports 25 and 26, the stop washer is provided with notches 32 and 33 on opposite sides thereof and which register with the inlets to the ports of the drain plug, the notches 32 and 33 being retained in alignment with the ports by providing the washer with an opening 34 corresponding in shape with the stem 28; for example, substantially square to conform to the cross section of the stem 28. The washer is retained against the inner end of the plug by a fastening device such as a cotter pin 35 projecting through an opening 36 in the stem located at a point just above the stop washer as shown in Figs. 2 and 3. The operating rod 30 extends upwardly through the crankcase and through a bearing opening 37 in the top of the cylinder block 38 so that the upper end projects therefrom a sufficient distance to mount a universal joint 39 or other flexible connection by which the rod may be rotated from the driver's position indicated by the steering wheel 40. The rod 30 is retained from axial movement in the bearing opening 37 by washers 41 and 42 engaging the upper and lower sides of the cylinder block and backed by cotter pins 43 and 44 projected through openings in the rod 30 as shown in Fig. 1. The socket 29 is of sufficient length so that when the plug is in open position the socket will remain in engagement with the stem 28. The universal joint is connected by a rod 44 with an operating knob 45 mounted on the instrument panel 6 so that when the knob is rotated in one direction the shaft 44 will rotate the shaft 30 through the universal joint 39, the socket 29 being connected with the stem 28 will rotate the plug to move the plug downwardly through the threaded opening so as to expose the outlets 27 of the plug ports as shown in Fig. 3. When the knob is rotated in the opposite direction, the plug is threaded back into the opening to effect a seal of the plug with the gasket.

In order that supply of fresh lubricating oil may be carried on the vehicle, the engine compartment is provided with an auxiliary tank 46 that is mounted on a flange 47 extending across the panel 5. The tank 46 has a fill spout 48 opening outwardly through the side of the car and is closed by a cap 49. The tank 46 has an outlet 50 connected with a substantially horizontally positioned shut-off valve 51 which in turn is connected by a duct 52 with the oil inlet pipe previously mentioned. The valve 51 has a stem 53 extending upwardly and rearwardly through the instrument panel 5 to mount an operating knob 54 by which the rod may be rotated to open and close the valve.

In order to prevent excessive spraying of the oil, the oil outlet in the bottom of the oil pan may be covered by a guard 55 that is welded to the pan and has suitable openings 56 through which the oil is sprayed incidental to movement of the vehicle.

In using the apparatus constructed and assembled in a vehicle as illustrated, the drain plug is normally closed as shown in Figs. 1 and 2 to retain a body of oil 57 in the oil pan. A measured quantity of fresh oil is inserted in the auxiliary tank, the valve 51 having been closed to retain the fresh oil therein. When it becomes necessary to change the oil, the operator of the vehicle merely rotates the knob 45 to turn the plug in the threaded opening of the oil pan so as to project the outlets 27 of the valve ports 25 and 26 as shown in Fig. 3. When the ports are exposed, movement of the plug is stopped by the washer 31 engaging the upper face of the ring 15 as shown in Fig. 3. The oil in the pan then drains through the ports of the plug and is discharged onto the roadway in finely atomized form incidental to flow of air when the automobile is in motion. When the oil has been drained from the oil sump of the pan the knob 45 is rotated in the opposite direction to rotate the plug until the gasket seals against the bottom of the pan and seals the opening as shown in Fig. 2. The knob 54 is then rotated to open the valve 51 so that oil flows from the auxiliary tank through the duct 52 into the oil fill pipe from where the oil flows to the sump 9 of the oil pan 8.

The time required to empty the dirty oil and refill with new oil is so short that there is no danger of causing injury to the working parts of the motor since these parts retain a sufficient film of oil to keep them in operation for a considerable period.

From the foregoing it is obvious that I have provided an apparatus for servicing a vehicle with lubricating oil which is readily operated while the vehicle is in motion. When the oil is thus drained, it is quickly and readily dispensed in such an atomized form that it is not objectionable when discharged on paving of a highway.

It is also obvious that since the plug retains its threaded engagement with the threaded ring of the oil pan, the plug cannot be displaced and is adapted to be returned to closed relation with the drain opening without danger of losing any of the fresh oil from the oil pan of the engine.

What I claim and desire to secure by Letters Patent is:

1. In combination with a motor vehicle engine having an internally threaded drain opening in a lower portion of said engine, a plug having external threads engaging the internal threads of said opening, a head on the plug for effecting a seal about said opening when the plug is turned in one direction, said plug having a port for outlet of oil from the engine when the plug is turned in the opposite direction, a stop on the plug to limit movement of the plug when the plug is turned in said opposite direction and having a notch registered with said port, and means having connection with the plug and extending upwardly through the top of the engine for turning the plug.

2. In an engine having an internally threaded drain opening in the lower portion of said engine, a drain plug having an externally threaded cylindrical body engaged in said opening, a head on said body, a gasket carried by the head and encircling the body, a drain port in said body, a stem on said body projecting within the engine, a stop washer on the stem having a notch registering with said port, and a socket member in the engine and engaged with said stem for rotating the plug.

3. In a liquid containing device provided with an internally threaded drain opening encircled on the exterior side of the crankcase with an annular seating face, a plug having exernal threads engaging the internal threads of the opening, a head on the plug providing an annular shoulder for effecting a seal with said seating face when the plug is turned in said internal threads and adapted to be unseated from said face when the plug is turned in the opposite direction, said plug having a port formed as a notch in a side thereof and extending through an end of the plug opposite said head and adapted to be exposed through said seating face for outlet of liquid from the liquid containing device when the plug is turned to unseat said shoulder a stem projecting axially from said end of the plug, a stop washer on the stem and having a peripheral portion adapted to engage the inner side of the liquid containing device and having a notch registered with said port, and a pin extending through the stem to retain the washer for limiting axial movement of the plug when said plug is turned to said unseating position.

4. In a liquid containing device having an internally threaded drain opening encircled on the exterior side of the crankcase with an annular seating face, a plug having external threads engaging the internal threads of the opening, a head on the plug providing an annular shoulder for effecting a seal with said seating face when the plug is turned in said internal threads and adapted to be unseated from said face when the plug is turned in the opposite direction, said plug having notches in opposite sides and extending through the end of the plug opposite said head providing ports adapted to be exposed through said seating face for outlet of liquid when the plug is turned to unseat said shoulder, a stop washer on said end of the plug having a peripheral portion adapted to engage the inner side of the liquid containing device to limit axial movement of the plug when said plug is turned to said unseating position and having notches registering with the notches of the plug, a stem on said end of the plug to mount the washer, and a pin extending through the stem to retain the stop washer.

5. In a motor vehicle engine having a crankcase provided with an internally threaded drain opening encircled on the exterior side of the crankcase with an annular seating face, a plug having external threads engaging the internal threads of the opening, a head on the plug providing an annular shoulder for effecting a seal with said seating face when the plug is turned in said internal threads and adapted to be unseated from said face when the plug is turned in the opposite direction, said plug having a port adapted to be exposed through said seating face for outlet of oil from the crankcase when the plug is turned to unseat said shoulder, a stem on the plug projecting into the crankcase, a stop washer on the stem adapted to engage the inner side with the crankcase when said port is exposed through said seating face, and a plug actuating rod extending through the engine and having a slidable, rotatable driving connection with said stem to move the plug to and from said seating and unseating positions.

DAVID FRANSEN.

REFERENCES CITED

The following references are of record in the file of this patent:

UNITED STATES PATENTS

| Number | Name | Date |
|---|---|---|
| 869,853 | Lamouroux | Oct. 29, 1907 |
| 1,163,144 | Greer | Dec. 7, 1915 |
| 1,411,031 | Jackson | Mar. 28, 1922 |
| 1,442,502 | Waddell | Jan. 16, 1923 |
| 1,445,518 | Kokesh | Feb. 13, 1923 |
| 1,500,778 | Tarwater | July 8, 1924 |
| 1,557,390 | Tolk | Oct. 13, 1925 |
| 1,565,913 | Dosker | Dec. 15, 1925 |
| 1,665,288 | Taylor | Apr. 10, 1928 |
| 1,856,826 | Bennett | May 3, 1932 |
| 2,010,251 | Banowetz | Aug. 6, 1935 |
| 2,374,690 | Laue | May 1, 1945 |